May 18, 1943  C. T. HOLMAN  2,319,504
FASTENING DEVICE
Filed March 31, 1941

INVENTOR.
CLARENCE T. HOLMAN
BY
ATTORNEYS

Patented May 18, 1943

2,319,504

UNITED STATES PATENT OFFICE 2,319,504

FASTENING DEVICE

Clarence T. Holman, Glendale, Calif., assignor to The Weatherhead Company, Cleveland, Ohio, a corporation of Ohio Application March 31, 1941, Serial No. 386,073

7 Claims. (Cl. 220—55)

This invention relates broadly to a fastener and more specifically to a resilient expansible fastening device for securing a cover or closure member upon a receptacle.

Heretofore in the construction or assembly of receptacles, such as are commonly employed for electrical outlets, switch boxes or the like, flanges or lugs have been provided upon the receptacles for the securement of covers thereto. This type of construction necessitated the drilling and tapping of holes in the flanges or lugs and the subsequent insertion of screws or clips therein for securing the cover upon the receptacle. Thus, in attaching the cover to the receptacle, considerable difficulty was often encountered in aligning the openings in one member with those formed in the other and also in inserting the screws or clips in the openings. Furthermore, the assembly or reassembly of the receptacle made it necessary that the openings in the cover and box be located with extreme accuracy, in exact geometrical relationship, in order to align the openings in one member with those formed in the other member. This was due to the fact that, unless there was such accuracy, if the cover were turned end for end, the openings formed therein would often fail to align with those provided in the box, thus necessitating the reversing of the cover or box in order to align the several openings.

One of the objects of the present invention is the provision of a resilient expansible fastening device disposed on a closure member and engageable with a receptacle to secure the closure member thereto. Another object is to provide a fastening device having a resilient element so designed as to assist in guiding and securing the closure member upon the receptacle and in preventing vibration therebetween. Another object is to provide a simple and compact fastening device embodying a resilient expansible element. Further objects are to provide such a fastening device, which is light in weight, economical of manufacture, simple of construction, reliable and efficient in service and adapted to facilitate the ready attachment of a closure member to a receptacle.

Other objects and advantages more or less ancillary to the foregoing and the manner in which all the various objects are realized will appear in the following description, which considered in connection with the accompanying drawing, sets forth the preferred embodiment of the invention.

I preferably accomplish the above and other objects of the invention by providing a fastening device having a resilient element disposed upon a stud or bolt which is mounted in a cover to compress and expand the resilient element against a receptacle for securing the cover thereto. Preferably the resilient element is secured upon a bolt or stud which extends through the cover and has a nut threaded on the free end thereof for compressing the resilient element against the cover prior the expansion thereof against the sides of a receptacle.

Figure 1:
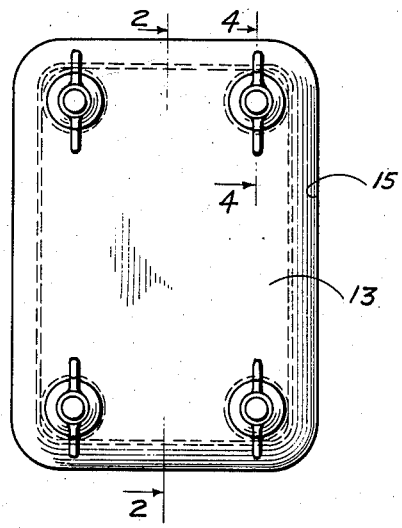
Fig. 1 is a plan view showing the cover or closure member secured upon the receptacle by the fastening device of the present invention.
Figure 2:
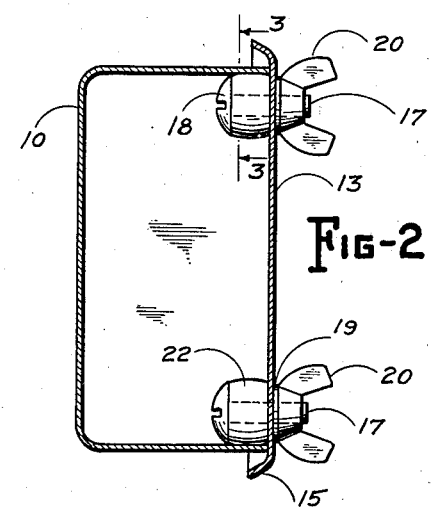
Fig. 2 is a vertical sectional view of the receptacle, the view being taken on a plane indicated by line 2—2 of Fig. 1.

Referring to Figs. 1 and 2, the receptacle shown therein for the purpose of illustration, comprises a hollow metallic body or base member 10 having a flat rear wall and integrally formed side and end walls disposed normal to the rear wall. The corners 11 of the body 10, at the juncture of the side and end walls, are rounded to facilitate the engagement of the fastening device thereto. A metallic cover or closure member 13 configured to enclose the open face of the body 10 is provided with an outwardly and downwardly projecting flange 15 adapted to overhang the side and end walls of the body. The receptacle shown herein is similar to those employed for electrical outlets or switch boxes although it will be readily apparent that the size and configuration may be varied, depending upon the use to which it is to be subjected.

The cover 13 has openings formed therein adjacent the corners thereof for the reception of studs or bolts 17 which are adapted to extend within the body 10 contiguous the rounded corners 11 when the cover is mounted upon the body. The head 18 of the bolt 17 is spaced from the inner surface of the cover 13 while a washer 19 and nut 20 mounted on the free or outer end of the bolt engage the external surface of the cover. A resilient expansible element 22 formed preferably of rubber, either natural or synthetic, and of a diameter greater than the head 18, is disposed on the bolt 17 intermediate the head 18 and the inner surface of the cover 13. The resilient elements may be of any desired configuration such as cylinders or tubes, and they may be molded or vulcanized on the bolt 17 or, if desired, they may be preformed with an opening therethrough of less diameter than the bolts to facilitate the adherence of the resilient element thereto and prevent the bolts from turning when the nuts 20 are tightened on the ends thereof.

In the assembly and securement of the cover on the body 10 the bolts or studs 17 having the resilient elements 22 disposed thereon are secured to the inner surface of the cover by the nuts 20. With the resilient elements depending from the cover, in their initial or unexpanded condition, the cover is brought into position against the open face of the body 10 with the bolts 17 and resilient elements 22 freely disposed in the corners 11. Upon the positioning of the cover on the body 10 the nuts 20 are rotated on the bolts for drawing the heads 18 towards the inner surface of the cover to compress the resilient elements 22 between the cover and heads 18. The compressing of the resilient elements causes them to have a radial expansion or swelling within the corners 11 for securely attaching the cover to the body. The resilient elements in their expanded status do not tend to distort or expand the side and end walls of the body but engage the corners 11 with sufficient force to retain the cover securely in position against the body 10. Because of the engagement in the corners, the walls are subjected principally to forces in tension, hence light gage materials can be used. Due to the manner in which the resilient elements are secured to the bolts the threading of the nuts on the ends thereof does not cause the bolts to turn during the compressing and expanding of the elements. It will be readily apparent that the resilient elements may be expanded slightly prior to the positioning of the cover on the body 10 so that when the cover is applied to the body the partially expanded elements may be forced into the corners 11 to temporarily and removably hold the cover in place.

Figure 3:
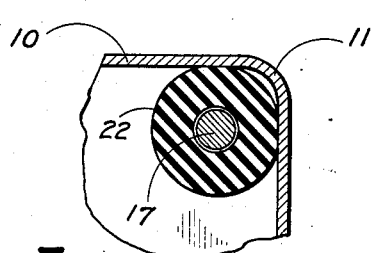
Fig. 3 is an enlarged vertical sectional view of a fragmentary portion of the receptacle and closure member, showing the resilient fastening device for securing the closure member upon the receptacle, the view being taken on a plane indicated by line 3—3 of Fig. 2.
Figure 4:
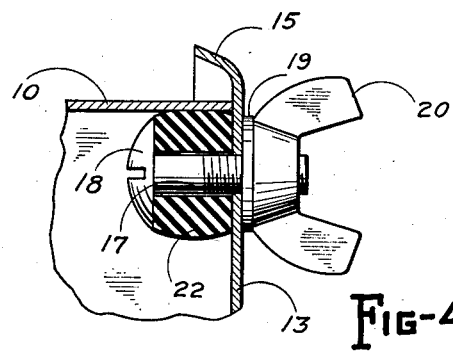
Fig. 4 is a transverse sectional view of a portion of the receptacle showing the resilient fastening device disposed in a corner thereof, the view being taken on a plane indicated by line 4—4 of Fig. 1.
Figure 5:
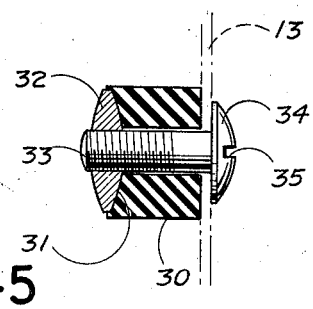
Fig. 5 is a vertical sectional view of a modified form of the fastening device.

In the modified form of the invention illustrated in Fig. 5 the resilient element 30 is similar to the one disclosed in Figs. 2 and 3 with the exception that one end of the resilient element 30 has a concave surface 31 formed thereon for the reception of a convex faced nut 32. While the resilient element 30 and nut 32 may be formed and provided as separate parts it is preferable that the resilient element be molded, vulcanized or otherwise affixed to the nut 32.

The assembly of the fastening device upon the cover is similar to that disclosed in Fig. 1 with the exception that bolts 33 extend through the openings formed in the cover with the heads 34 of the bolts bearing against the outer surface of the cover. Slots 35 are formed in the heads 34 for the insertion of a screw driver or the like to facilitate the attachment of the resilient element and nut and the consequent compression and expansion of the element for securing the cover to the body.

Figure 6:
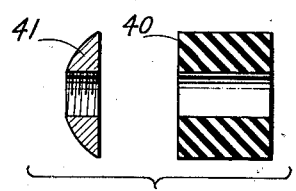
Fig. 6 is a vertical sectional view of still another modified form of the fastening device.

In the modification shown in Fig. 6 the resilient element 40 may be formed as a tubular cylindrical member of rubber, rubber composition or the like with the ends thereof flat and parallel to one another. A nut 41 having the inner face thereof configured for intimate engagement with one end of the resilient element has the periphery thereof rounded to merge with and form a part of the resilient element. The resilient element 40 and nut 41 are secured to the cover in the same manner as that disclosed for the resilient element of Fig. 5.

Although the cover for the body 10 has been shown as containing a resilient fastening device in each corner thereof, it will be readily apparent that the number of fastening devices needed may be determined by the type of installation desired and the configuration and size of the receptacle body. Furthermore, the frictional engagement of the resilient elements with the inner surface of the cover and the heads of the bolts prevents the bolts from rotating upon the threading of the nuts on the free ends thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination a rectangular body having an opening, a closure member for the opening in the body, a resilient expansible element of small cross-sectional area as compared to the area of said opening mounted on said closure member in fixed position and laterally engageable with a side and end wall only of said body, and means for expanding said element laterally when in operative position to secure the closure member to said body.

2. A fastener for a receptacle comprising a body having an opening therein, the walls of said body forming corners therein, a cover for said opening, a plurality of resilient blocks mounted at spaced points on the inner side of the cover and arranged to be received in said corners of said body and means operable from the outer side of the cover for expanding said blocks against the corners to secure the cover to the body.

3. A fastener for a receptacle embodying a body with an opening therein, a closure member for said opening, the walls of said body forming corners therein, means for securing the cover to the body, comprising bolts extending through said cover in alignment with the corners of said body, the heads of said bolts being spaced from the inner surface of the cover, resilient blocks disposed on said bolts intermediate the heads and cover, nuts threaded on the free ends of said bolts for compressing said blocks between said heads and cover and thereby expand the blocks in the corners.

4. In combination, a body having an opening therein, a cover for said opening, the walls of said body defining corners therein, bolts extending through said cover with their free ends spaced from the inner surface of the cover, resilient elements disposed on said bolts and receivable in said corners, nuts threaded on the free ends of said bolts for compressing the resilient elements against the cover and expanding the resilient elements against said body to secure the cover to the body.

5. A fastener for a receptacle comprising a body with an opening therein, the walls of said body forming corners, a cover for said opening having apertures therein in alignment with said corners, bolts extending through said openings with the heads thereof spaced from the inner surface of the cover, resilient blocks mounted on the bolts intermediate the heads and the inner surface of the cover, and means on the free ends of the bolts for drawing the heads toward the cover and expanding the resilient blocks in said corners.

6. A fastener for a receptacle comprising a body with an opening therein, a cover for said opening, means for detachably securing the cover to the body comprising bolts mounted in the cover with the free ends thereof spaced from the inner surface of the cover, nuts on the free end of the bolts, resilient elements molded on the nuts and disposed on said bolts intermediate the cover and said nuts, said resilient elements engageable with said body upon the threading of the nuts on the bolts.

7. A fastener for a receptacle comprising a body having an opening therein, a cover for said opening, a plurality of resilient blocks mounted in fixed positions at spaced points on the inner side of said cover and arranged to be received within said body and disposed adjacent spaced points of the inner wall surfaces of said body, and means operable from the outer side of the cover for expanding said blocks laterally against said inner wall surfaces to secure the cover to the body.

CLARENCE T. HOLMAN.